Oct. 15, 1935.   G. CHUTORASH   2,017,528
COWL VENTILATOR
Filed Feb. 10, 1934
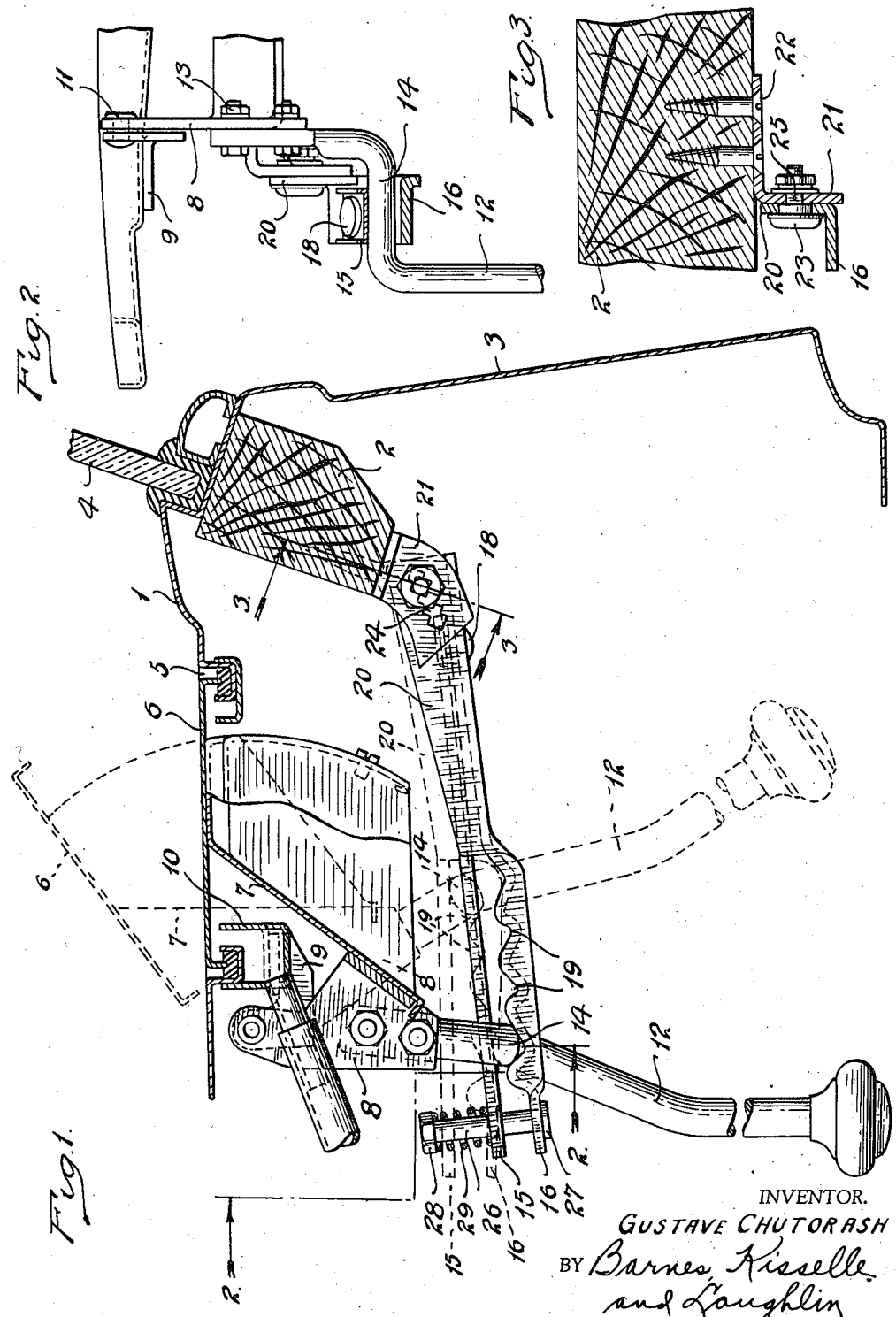
INVENTOR.
GUSTAVE CHUTORASH
BY Barnes, Kisselle
and Laughlin
ATTORNEYS.

Patented Oct. 15, 1935

2,017,528

UNITED STATES PATENT OFFICE 2,017,528

COWL VENTILATOR

Gustave Chutorash, Detroit, Mich., assignor to General Motors Corporation, Detroit, Mich., a corporation of Delaware Application February 10, 1934, Serial No. 710,741

6 Claims. (Cl. 98—2)

This invention relates to a cowl ventilator, and more particularly to an adjusting mechanism for such a ventilator.

It is an object of this invention to produce an adjusting mechanism for a ventilator which will not rattle, which will firmly hold the closure in closed or any of its desired open positions so that it will not rattle and yet which is easily operated to move the closure from its closed to any of its opened positions or vice versa. This object has been achieved through a pivoted arm having a plurality of notches held in yieldable engagement with the handle fixed to the swingable closure by resilient means carried by the arm.

In the drawing:

Fig. 1 is a vertical longitudinal section through the cowl of an automotive vehicle body showing the ventilator mechanism in closed and open positions.

Fig. 2 is a section along the line 2—2 of Fig. 1.

Fig. 3 is a section along the line 3—3 of Fig. 1.

Referring more particularly to the drawing, the cowl of the vehicle body may be designated 1, the cowl bar 2, the instrument panel 3 and the windshield 4. The cowl is provided with ventilating opening 5 having a closure 6. The closure 6 has fixed to the underside thereof a baffle plate 7 which in turn supports the hinge plate 8. A cooperating hinge plate 9 is fixed to the drain trough 10 which in turn is fixed to the under face of the cowl around the periphery of the ventilating opening 5. The hinge members 8 and 9 are pivoted together by the hinge pin 11. An adjusting handle 12 is bolted to the hinge plate 8 by the bolts 13. This handle 12 has a lateral offset portion 14. The closure 6 may be swung from closed to open position or vice versa by actuating the handle 12.

Inasmuch as it is essential to firmly hold the closure 6 in its closed or any one of its open positions without rattles, to this end the closure is provided with an adjusting device in the form of an arm 16. The arm 16 is provided with a series of notches 19 for reception of the offset portion 14 of the handle 12. The arm 16 may be yieldably held in engagement with offset 14 by any suitable means. Preferably this means is mounted on arm 16 and takes the form of a member 15 comprising a strip of metal, such as spring steel, which is fixed at one end to the arm 16 in any suitable manner such as by the rivet 18. The arm 16 is also provided with the upwardly turned flange 20 which is pivotally supported upon the pin 23 which is secured to the bracket 21. The bracket 21 is secured to the under face of the cowl bar by any suitable means such as the screws 22. It is important that the closure 6 when in closed position should have a tight weather-proof seal with the rubber gasket about the periphery of the opening 5. To obtain the proper sealing pressure between the closure and the rubber gasket the bracket 21 is provided with a serrated opening 24 comprising a plurality of adjoining communicating square openings. The serrations of the opening 24 cooperate with the square portion 25 of the hinge pin 23 to provide a series of positions at any one of which the arm 16 may be pivotally mounted upon the bracket 21. Thus, when the closure 6 is in closed position it is possible by positioning the square portion 25 of the hinge pin 23 in the proper serration of the opening 24 to obtain the proper position for the arm 16 and handle 12 and thus obtain the required adjustment of the closure 6 for proper sealing pressure with the rubber gasket.

The outer ends of the arm 16 and strip 15 are provided with suitable openings through which is passed the pin 26. The lower end 27 of the pin is pinched or upset and the upper end is provided with a head 28. The pin 26 has a small clearance in the openings through the arm 16 and strip 15 so that the members 15 and 16 are free to move toward and away from each other. A helical coil spring 29 is threaded over the pin 26 and positioned between the head 28 and the upper face of the member 15. This spring acts upon the member 15 so that it yieldably engages the offset portion 14 of the handle 12 to retain the same in any one of the notches 19.

The closed position of the closure 6 and the adjusting mechanism is shown in the full lines in Fig. 1. To open the closure 6 the handle 12 is moved toward the operator, or to the right, as viewed in Fig. 1. The full open position is shown in the dotted lines. As the handle 12 is moved from one notch 19 over the hump into the next notch the spring member 15, which is backed by the coil spring 29, is sprung upwardly and as the offset portion 14 of the handle moves into the next notch the member 15 again moves downwardly to yieldably hold the offset 14 in the notch. Members 15 and 16, as the handle 12 is moved from one notch to the other, operate like a pair of spring jaws to grip the offset portion 14 and thus hold the handle and closure 6 in their adjusted position. Inasmuch as the handle 12 and its offset portion 14 swing about the pin 11 as a center when the closure 6 is being moved from open to closed position or vice versa, the path of travel by the offset portion 14 is arcuate. This arcuate travel of the offset portion 14 of the arm 12 is compensated for by the pivoting of the arm 16 about the pin 23. Hence, during the adjustment of the closure 6 the arm 12 swings about the pin 11 as a center and simultaneously the jaws 15 and 16 swing about the pin 23 as a center.

I claim:

1. The combination with a pivoted closure having a handle fixed thereto for swinging the same to open and closed position, of an adjusting device comprising a notched arm pivoted about a point spaced from the pivot of the swingable handle, means on said handle arranged to be yieldably engaged by the said arm and movable from one notch to the other whereby the handle and pivoted arm swing about their respective pivots as the handle is moved to effect an adjustment of the closure, and resilient means carried by the said arm in vertical alignment with said notches for retaining the arm yieldably engaged with the said means on the handle.

2. The combination with a pivoted closure having a handle fixed thereto for moving the same to open and closed position, of an adjusting device comprising a pivoted arm having a plurality of notches, means on said handle for engaging the said arm and movable from one notch to the other as the handle is moved to effect adjustment of the closure, and yieldable means mounted upon the said pivoted arm in vertical alignment with said notches for yieldably retaining the said arm in engagement with the aforementioned means on the handle.

3. The combination with a pivoted closure having a handle fixed thereto for moving the same to open and closed position, of an adjusting device comprising a pivoted arm having a plurality of notches, means on the said handle arranged to engage the said arm in the said notches and movable from one notch to the other as the handle is moved to effect an adjustment of the closure, and a spring member mounted in vertical alignment with said notches on the said pivoted arm arranged to yieldably engage the aforementioned means on the handle to retain the notched pivoted arm in yieldable engagement with the aforementioned means on the handle to yieldably hold the closure in its adjusted position.

4. The combination with a pivoted closure having a handle fixed thereto for moving the same to open and closed position, of an adjusting device comprising a pivoted arm having a plurality of notches, the said arm being pivoted about a center spaced from the pivot of the said closure, means on said handle arranged to engage the said arm in said notches and movable from one notch to the other as the handle is moved to effect an adjustment of the closure, a spring metal strip secured at one end to the arm in vertical alignment therewith and cooperating with the notched portion of the arm to form a pair of yieldable jaws for gripping the said means on the handle to hold the closure in its adjusted position.

5. The combination with a pivoted closure having a handle fixed thereto for moving the same to open and closed position, of an adjusting device comprising a pivoted arm having a plurality of notches, the said arm being pivoted about a center spaced from the pivot of the said closure, means on said handle arranged to engage the said arm in said notches and movable from one notch to the other as the handle is moved to effect an adjustment of the closure, a spring metal strip secured at one end to the arm and in vertical alignment with the notches and coperating with the notched portion of the arm to form a pair of yieldable jaws for gripping the said means on the handle to hold the closure in its adjusted position, and resilient means associated with the said arm and spring metal strip for yieldably urging the said strip and arm together and into engagement with the said means on the handle.

6. A cowl ventilator for an automotive vehicle comprising a pivoted closure having a handle fixed thereto, a bracket secured to the cowl bar, a serrated opening in the said bracket, an arm arranged to be pivotally connected to the said bracket in any one of said serrations, a plurality of notches on the said arm, means on said handle arranged to engage the said arm in said notches and movable from one notch to the other as the handle is moved to adjust the closure, and resilient means carried by the said arm for yieldably retaining the said arm in engagement with the said means on the handle.

GUSTAVE CHUTORASH.